United States Patent [19]

Kofler

[11] Patent Number: 5,549,187
[45] Date of Patent: Aug. 27, 1996

[54] FREE-WHEELING COUPLING SENSITIVE TO THE DIRECTION OF ROTATION

[75] Inventor: Hansjörg Kofler, Graz, Austria

[73] Assignee: Steyr-Daimler-Puch AG, Vienna, Austria

[21] Appl. No.: 288,148

[22] Filed: Aug. 9, 1994

[30] Foreign Application Priority Data

Aug. 16, 1993 [DE] Germany .......................... 43 27 472.2
May 4, 1994 [DE] Germany .......................... 44 15 774.6

[51] Int. Cl.$^6$ ............... F16D 41/10; B60K 23/08
[52] U.S. Cl. ............... 192/35; 192/38; 192/44; 192/103 R
[58] Field of Search ............... 192/35, 36, 37, 192/38, 43, 44, 103 R

[56] References Cited

U.S. PATENT DOCUMENTS

| 3,055,471 | 9/1962 | Warn et al. ............... 192/38 X |
| 3,300,002 | 1/1967 | Roper ............... 192/35 |
| 3,406,798 | 10/1968 | Curran ............... 192/35 |
| 4,124,085 | 11/1978 | Fogelberg . | |
| 4,361,216 | 11/1982 | Overbeek ............... 192/36 |
| 5,103,950 | 4/1992 | Ito et al. ............... 192/35 |

FOREIGN PATENT DOCUMENTS

| 2740638 | 3/1978 | Germany . |
| 4202152 | 8/1993 | Germany . |
| 4201375 | 8/1993 | Germany . |
| 4225202 | 9/1993 | Germany . |

Primary Examiner—Richard M. Lorence
Attorney, Agent, or Firm—Meltzer, Lippe, Goldstein et al.

[57] ABSTRACT

A free-wheeling coupling sensitive to the direction of rotation for a motor vehicle comprises a first ring which constitutes a driving element in a towing mode of the motor vehicle, a second ring which constitutes a driven element in the towing mode, clamping elements which act between the first and second rings to transfer torque in both directions of torque flow, a cage in which the clamping elements are disposed, a fixed friction ring, and a friction element actively connecting the cage to the fixed friction ring. The friction element comprises a plurality of friction segments disposed between the cage and the fixed friction ring, the friction segments being slaved to rotate in the circumferential direction with the cage and being lifted away from the fixed friction ring by centrifugal force when they are caused to rotate at a rotational speed which is greater than a predetermined rotational speed. The free-wheeling coupling further comprises a catch interacting between the first ring and the cage under the control of frictional force or an additional frictional element to inhibit over-rotation of the cage with respect to the first ring, thereby preventing "breakthrough" of the clamping elements when the direction of torque flow changes abruptly.

7 Claims, 13 Drawing Sheets

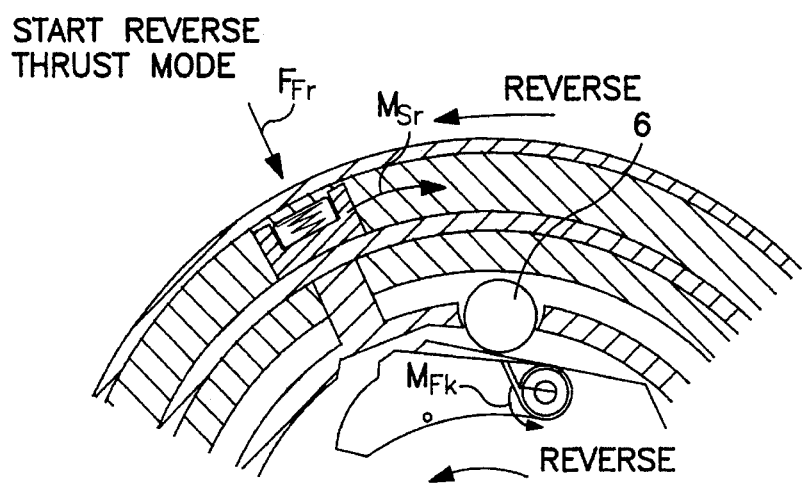
FIG. 12    POSITION 1
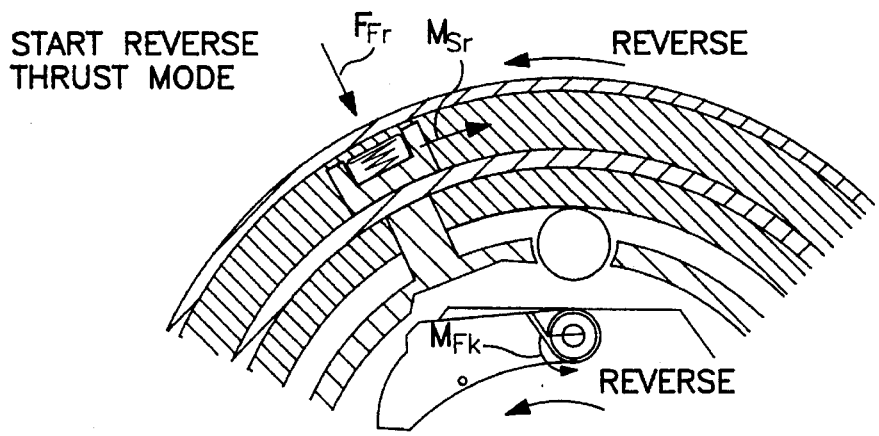
FIG. 13    POSITION 2
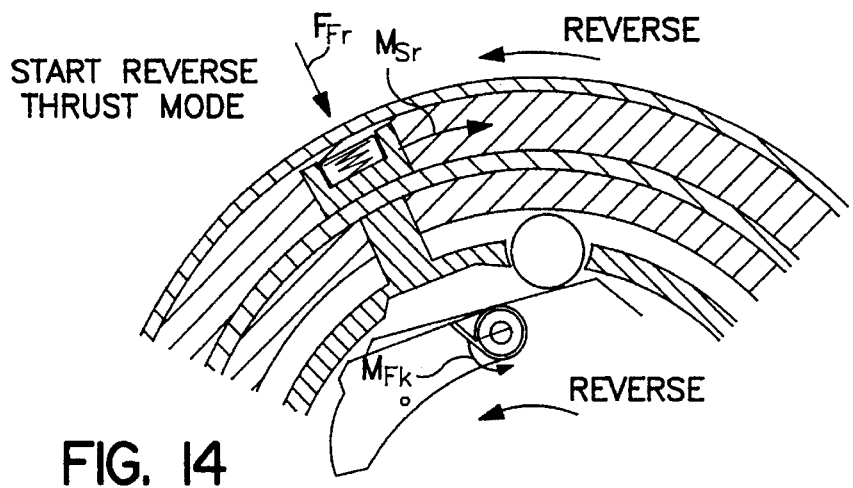
FIG. 14    POSITION 3

5,549,187

FREE-WHEELING COUPLING SENSITIVE TO THE DIRECTION OF ROTATION

BACKGROUND OF THE INVENTION

In an all-wheel drive motor vehicle with a second drive axle (usually the rear axle) driven via a slip-controlled coupling, the problem exists that the rear wheels tend to over-brake and thus lose ground adhesion, leading to skidding of the vehicle. This happens because of the connection to the front wheels. The condition is especially apparent when the vehicle employs an ABS system, and in cases of lock-up braking.

For this reason the additional utilization of a dual action freewheeling coupling (sometimes referred to as an overrunning clutch) is customary so that a controllable separation coupling does not have to be used, and yet all-wheel drive in reverse travel is possible. For this reason dual-action clamping element couplings have been proposed, in which differential rotational speed sensing elements ensure coupling in both directions of torque flow and where centrifugal elements prevent a torque flow reversal at high speed (e.g., the German patent applications DE 42 01 375, 42 02 152 and 42 25 202 by the assignee herein). These solutions have the disadvantage, however, that when the circumferential speeds of the front and rear wheels differ because of tire wear or due to layout necessities, stress within the vehicle occurs at low speed and low load causing not only performance losses but also causing the clamping elements to be held in the clamped position. For this reason other solutions to this problem have been investigated.

The instant invention therefore relates to a rotationally dependent free-wheeling coupling comprising the following elements: a first ring which is the driving element in towing mode; a second ring which is the driven element in towing mode; clamping elements which act between the first and the second rings in both torque flow directions; a cage which holds the clamping elements; and a friction element actively connecting the cage to a fixed ring. (In this description, the "towing mode" refers to the situation wherein the engine drives the vehicle and torque flows from the engine to the axle, whether the vehicle is in forward or reverse travel. "Thrust mode" is the situation wherein the engine brakes the vehicle and torque flows from the axle to the engine.)

Such a free-wheeling coupling with clamping or wedging rollers acting in both directions for the transmission of drive forces to a second drive axle of a vehicle (here the front axle) is known from DE-A 27 40 638 (U.S. Pat. No. 4,124,085). A frictional connection exists between the ring pertaining to the second drive axle and a clamping roller cage. When overrunning occurs, a latch mechanism controlled via a second frictional connection to the fixed housing prevents the clamping roller cage from moving into the position in which torque flows from the second drive axle to the drive mechanism of the vehicle or to the first drive axle.

If reliable switching is desired in the free-wheeling coupling described therein, it is necessary to use a frictional element which has the disadvantages of relatively high power loss and a tendency to wear. Even so, reliable switching at extreme accelerations, e.g., with lock-up braking, is not ensured. Under extreme conditions of torque change, "breakthrough," a situation wherein the clamping elements disengage from the ramps associated with one torque flow direction and overshoot to the ramps for the opposite torque flow direction so that they couple when they should not do so during braking, can occur.

Another dual action free-wheeling coupling of a similar type was proposed in the as yet unpublished German patent application DE-43 11 288 (corresponding to U.S. application Ser. No. 08/222,802, filed Apr. 5, 1994) of the presented assignee. In the device described therein, completely friction and wear-free operation and protection against breakthrough when the direction of torque flow changes is ensured in all continuous operation states due to the interaction of a latch with the cage under the influence of a retaining spring and a slipping spring. However, there are still situations even with this free-wheeling coupling when faultless operation is not ensured. These situations may generally occur when the clamping elements are in a certain configuration (described as position 3 below and illustrated, for example, in FIG. 5) during start-up in the towing mode. Even if such situations occur rarely, it is necessary to correct them in view of the safety standards applied today in the construction of motor vehicles.

Such a situation arises, for example, as follows: When the vehicle climbs a slope in reverse and torque is thereby being transmitted to the rear axle, the free-wheeling device assumes position 3. In the free-wheeling coupling described in that patent application, position 3 is not an accessible configuration for forward travel in the thrust mode. Thus, when the driver stops the vehicle, shifts to a forward speed and lets the vehicle roll without operating the accelerator, the free-wheeling device cannot shift into the proper configuration. It is therefore not certain that the free-wheeling coupling will have zero torque in case of subsequent braking.

It is therefore the object of the invention, while avoiding the disadvantages of the two designs described above, to provide a free-wheeling coupling sensitive to the direction of rotation which has at its disposal sufficient switching force, with minimal friction losses, in all continuous operation states to access the proper configurations so as to avoid such problems in exceptional situations, and which eliminates the possibility of breakthrough even in case of sudden changes of direction of torque flow.

SUMMARY OF THE INVENTION

According to the invention, a free-wheeling coupling sensitive to the direction of rotation comprises a first ring which constitutes a driving element in the towing mode of the motor vehicle, a second ring which constitutes a driven element in the towing mode, clamping elements which act between the first and second rings to transfer torque between the first and second rings in both directions of torque flow, and a cage in which the clamping elements are held. The inventive free-wheeling coupling further comprises friction segments slaved to rotation of the cage in the circumferential direction, the friction segments interacting with a fixed friction ring and lifting off from the fixed friction ring due to centrifugal force after a certain rotational speed has been reached. The inventive free-wheeling coupling further comprises a catch interacting between the first ring and the cage to inhibit over-rotation of the cage with respect to the first ring. The cage is thus controlled in a direction-of-rotation sensitive manner. The interaction of these elements overcomes the problems in the above-described exceptional situations. Since the friction segments lift off from the fixed ring after a certain rotational speed has been reached, the element which senses absolute rotational speeds does not cause any frictional losses in continuous operation states. The catch interacting between the cage and first ring prevents breakthrough even in case of a sudden change in the direction of torque flow.

The catch is preferably mounted on the first ring which is the inside ring in such manner as to be capable of swivelling around a longitudinal axis and is engageable with a recess of the cage. Thus an advantageous configuration and placement of the catch and a coupling with minimal overall dimensions is obtained.

In a first embodiment of the invention, the catch acting between the first ring and the cage is mounted eccentrically on tile first ring and is engageable with a recess of the cage as a result of the centrifugal force acting upon it. In a second embodiment of the invention, the catch acting between the first ring and the cage is essentially mounted centrically on the first ring, and a friction element interacts with the fixed friction ring, said friction element being connected to a point of application of force of the catch outside its swivelling axis, thus causing its engagement with the recess of the cage. In this latter embodiment, the immediate assumption of a free-wheel position is ensured even when lock-up braking occurs at high speed. It will be apparent that both of these embodiments can also be implemented by mounting the catch on the cage, with the catch being engageable with a recess of the first ring.

In a variant of both embodiments, a stop is provided on the cage to restrict the radial outward movement of the friction segments and an additional friction element is located between the second ring and the cage.

In another variant of both embodiments, a stop is provided on the second ring to restrict the radial outward movement of the: friction segments, the stop exerting a frictional torque to the second ring when the friction segments are applied, causing a relative rotation to take place between the second ring and the cage.

BRIEF DESCRIPTION OF THE DRAWINGS

The invention is described and explained in greater detail below with reference to the drawings, wherein

FIGS. 12,13,14 schematically show operation for three different initial positions at start for reverse travel in thrusting mode for the first embodiment;

DETAILED DESCRIPTION OF PREFERRED EMBODIMENTS

Figure 2:
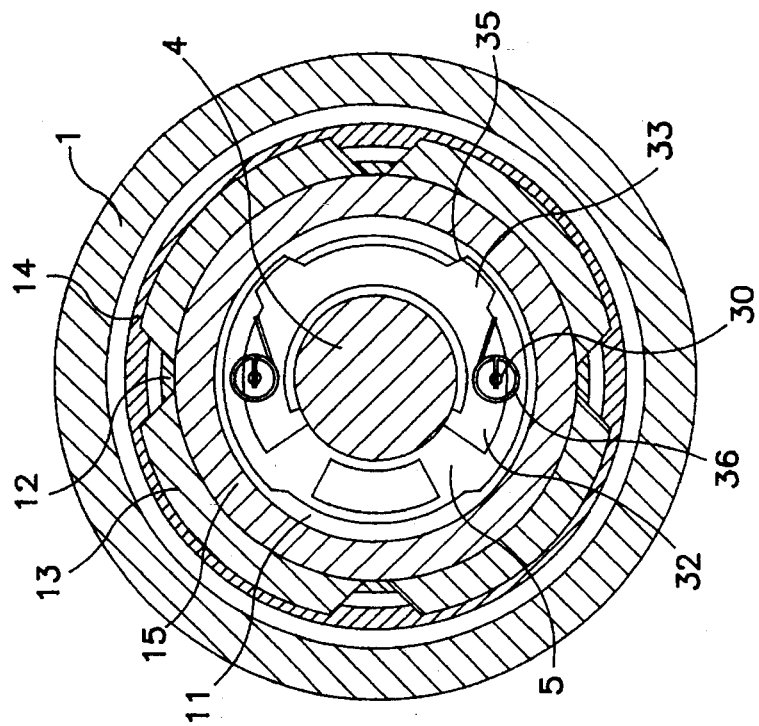
FIGS. 2 and 2a are cross-sections along II—II and II'—II' of FIGS. 1 and 1A respectively for both variants of the first embodiment.
Figure 1:
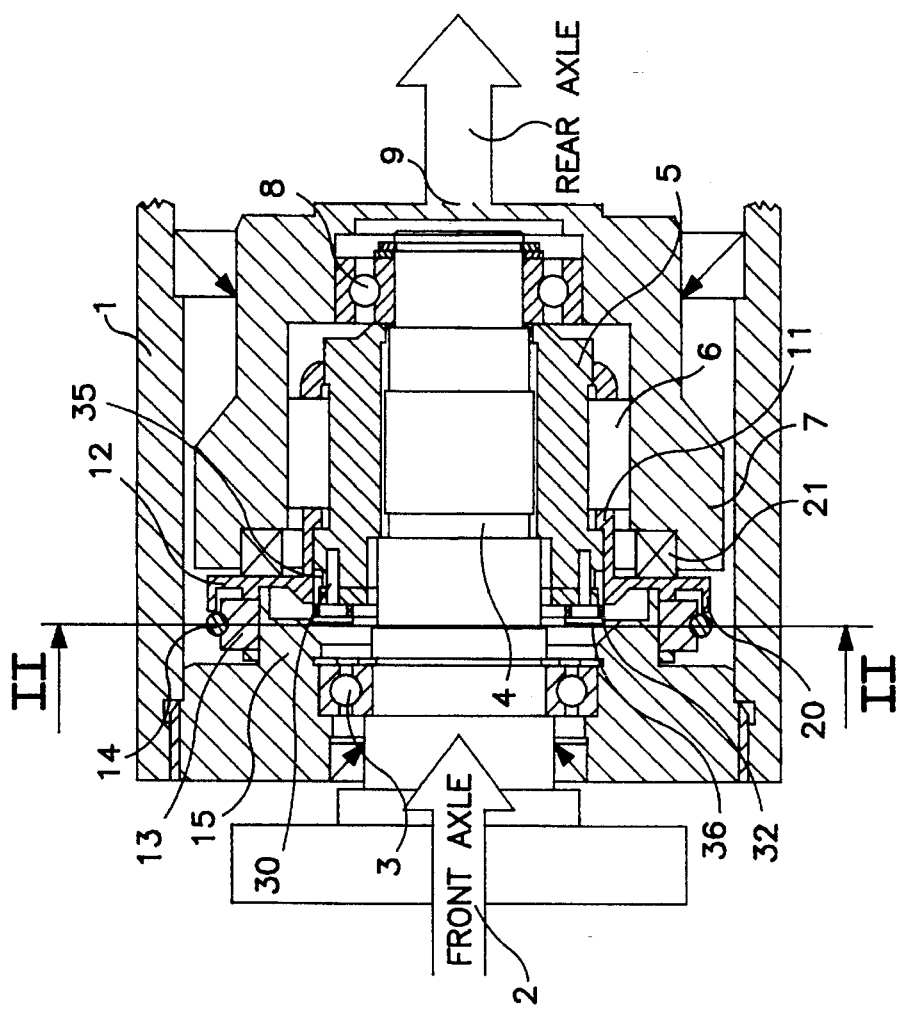
FIGS. 1 and 1a show axial sections of first and second variants respectively of a first embodiment of the inventive free-wheeling coupling.
Figure 2A:
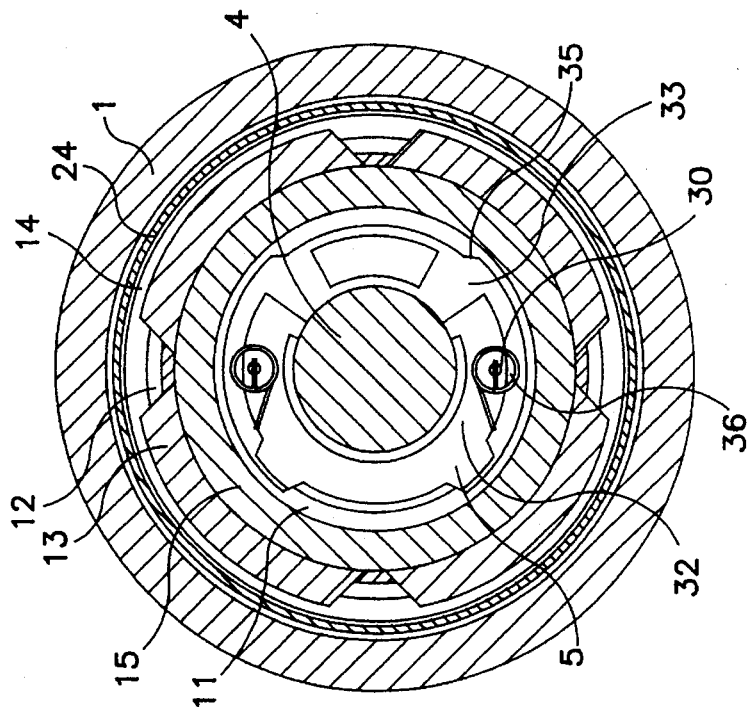
Figure 1A:
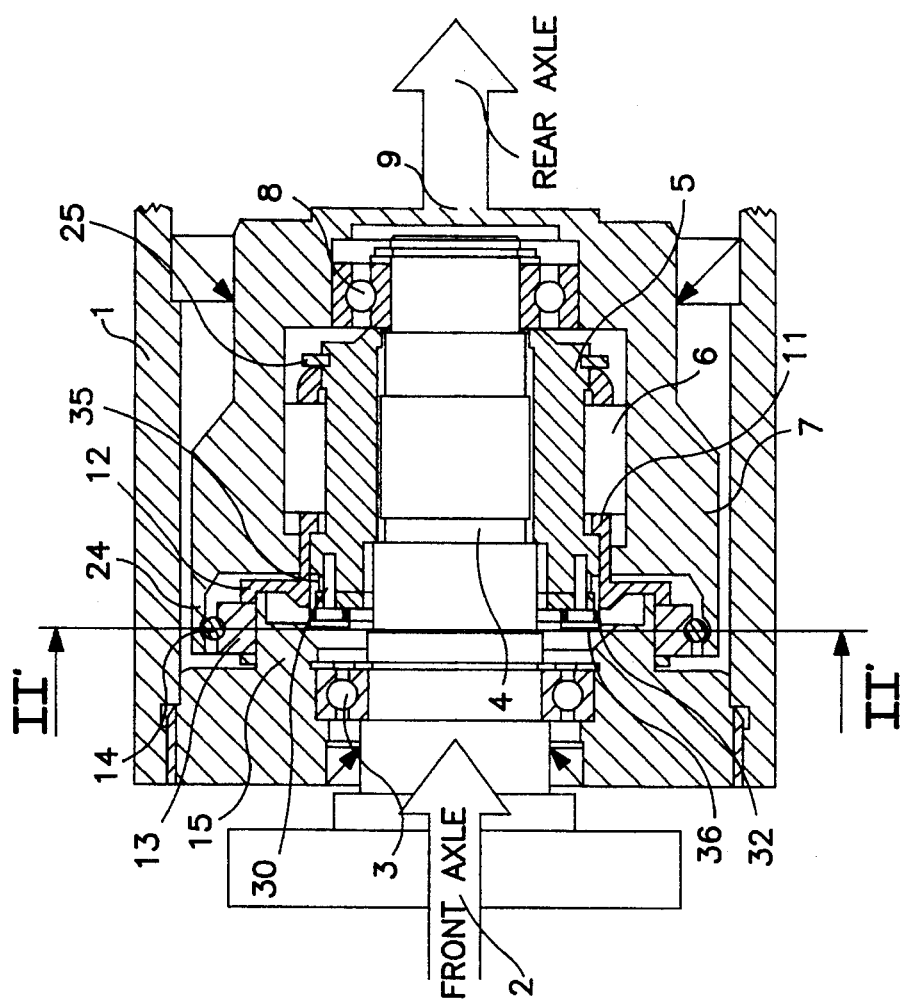

FIGS. 1 and 1a show the stationary housing 1 of a free-wheeling coupling installed in the drive train of an all-wheel drive motor vehicle. The free-wheeling coupling is connected for drive via a drive shaft 2 to a permanently driven axle (e.g., a front axle which is connected to the not-shown engine and transmission block). The drive shaft 2 is supported in housing 1 by a bearing 3 and ends in a splined shaft extension 4 on which a first ring 5 (the inner ring of the free-wheeling coupling) is seated. This first ring 5 is surrounded by a number of clamping elements 6. In FIGS. 1 and 1a, these are wedging rollers, but they may also be symmetric sprags which act in both directions of torque flow. The inner ring 5 is polyhedral with contact surfaces (ramps) for the clamping rollers. The clamping elements 6 are surrounded by an outer ring 7 which has a cylindrical running surface for the clamping elements 6. The outer ring 7 is centered in relation to the drive shaft 2 by means of a bearing 8 and is connected to the drive shaft 9 which leads to a rear axle not shown here.

A cage 11 which has an extension 12 of increased diameter is provided for guidance of the clamping elements 6. A number of friction segments 13 are installed and guided in openings of this extension 12. The friction segments 13 are pressed by a tubular spring 14 against a first fixed friction ring or collar 15 which may be part of the housing 1 but is in any case stationary. The friction segments 13 are slaved with the rotation of the cage 11 in the circumferential direction and, after a certain rotational speed has been reached, are lifted outwardly away from the friction ring 15 by the centrifugal force acting upon them in opposition to the pressing force of the tubular spring 14.

Two possibilities exist to limit the outward movement of the friction segments 13: According to FIG. 1a, the cage extension 12 includes an annular stop 20 which is frictionally connected to the outer ring 7 via a friction element 21. The stop 20 may be a disk connected radially to the cage extension 12 and which is radially crimped outside the friction segments 13. The friction element 21 may be made in the form of a friction ring or a number of slip springs or friction plates.

In FIG. 1, a stop 24 constitutes a ring-shaped extension of outer ring 7 with a diameter that is such that it surrounds the friction segments 13 on the outside, again with radial clearance. A friction element between the outer ring 7 and cage 11 is not required in this case, but a safety ring 25 is provided which prevents axial displacement of the cage 11.

Both variants are provided with catches 32 pivotably mounted on catch axes 30 on the inner ring 5, with noses 33 insertable into recesses 35 of the cage 11. These recesses are provided on the inside of the cage extension 12 and extend over an arc which corresponds approximately to the angle of rotation between cage 11 and inner ring 5 between a coupled and a neutral central position of the clamping elements 6. The catches 32 are held by torsion springs 36 in a retracted position in which the noses 33 are located outside the recesses 35. The noses 33 only take effect in recesses 35 when they are swivelled outward by centrifugal force which counteracts the force of the torsion springs 36 for sufficiently rapid rotation. Once the noses 33 enter the recesses 35, they prevent rotation of cage 11 relative to inner ring 5 beyond the central neutral position.

To adjust the limit speeds, one to lift the friction segments 13 away from fixed friction ring 15 in opposition to the force of tubular spring 14, and the other for the insertion of noses 33 of the catches 32 into recesses 35 of cage 11 in opposition to the force of torsion springs 36, the masses of the various elements, their centers of gravity, and the forces of springs 14 and 36 must be selected appropriately. This appears clearly from the following description of the operation of the invention.

For the description of operation in various different states, the convention adopted is that the thick arrows represent force and torque, and the thin arrows represent (rotational) direction of movement, the size of said arrows generally corresponding to the magnitude of what they represent.

1. Starting forward in towing mode operation (FIGS. 3 to 5)

Figure 3:
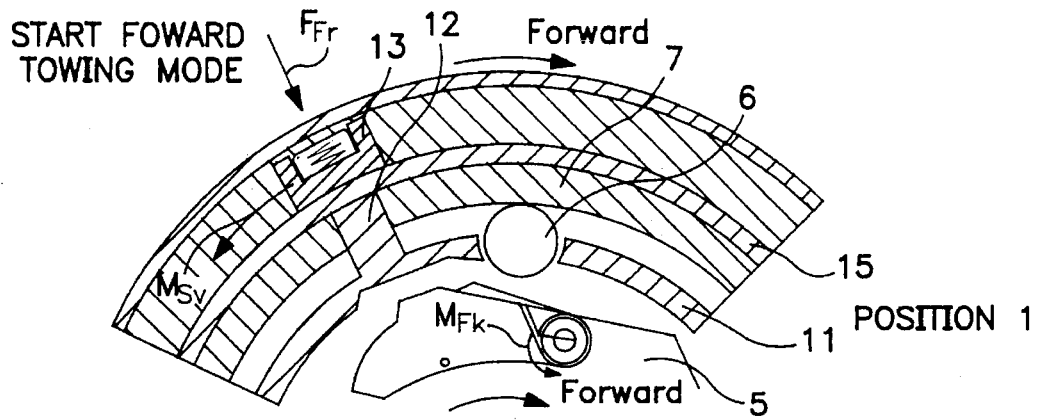
FIGS. 3,4,5 schematically show operation of the invention for three different initial positions at start for forward travel in towing mode for the first embodiment.
Figure 4:
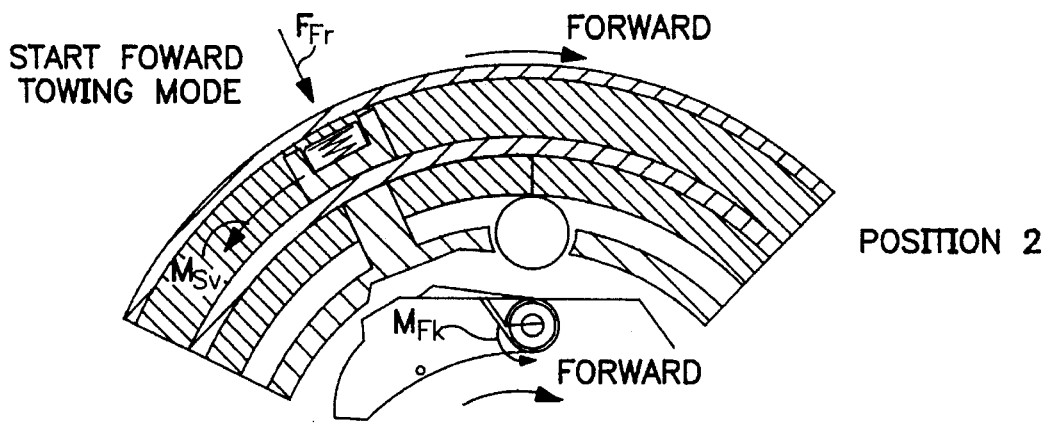
Figure 5:
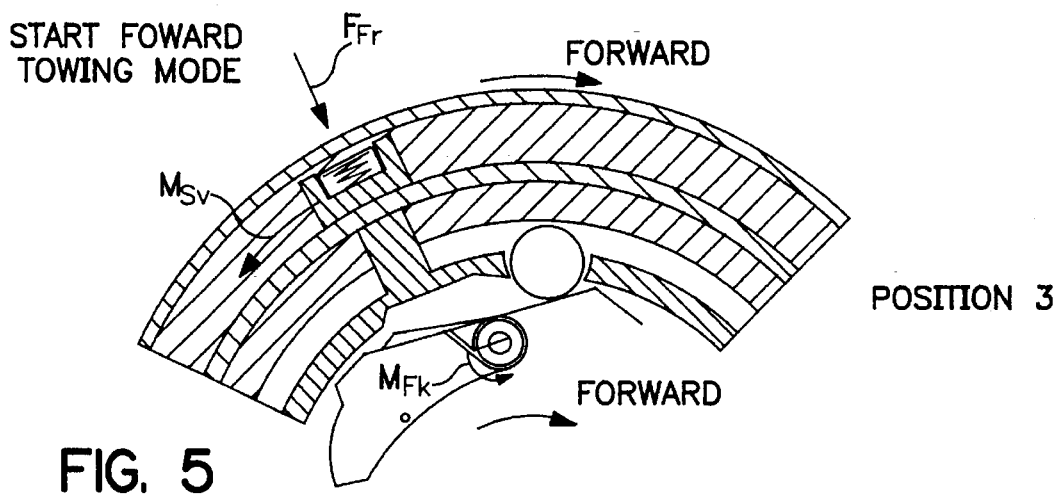

Depending on previous history, the free-wheel may be in three different initial positions at the time of start-up which are shown in FIGS. 3–5. When starting up, regardless of initial position, the first ring 5 provides drive, as illustrated by the longer inner arrow labelled FORWARD. In position 1 shown in FIG. 3, the clamping elements 6 are already wedged between the rings 5, 7. Therefore no action or frictional engagement of the cage is required.

When the vehicle starts up on a firm road surface from position 2 (neutral) shown in FIG. 4, both rings 5,7 would immediately begin to rotate at high speed with a free-wheeling coupling according to the prior art. Frictional engagement between the cage 11 and one of the two rings would therefore not engage the clamping elements 6 at that time. The frictional connection between cage 11 and the fixed friction ring 15 produces a tractive moment $M_{sv}$ which leads to contact with the clamping elements 6. The same applies to start-up from position 3 shown in FIG. 5.

Figure 6:
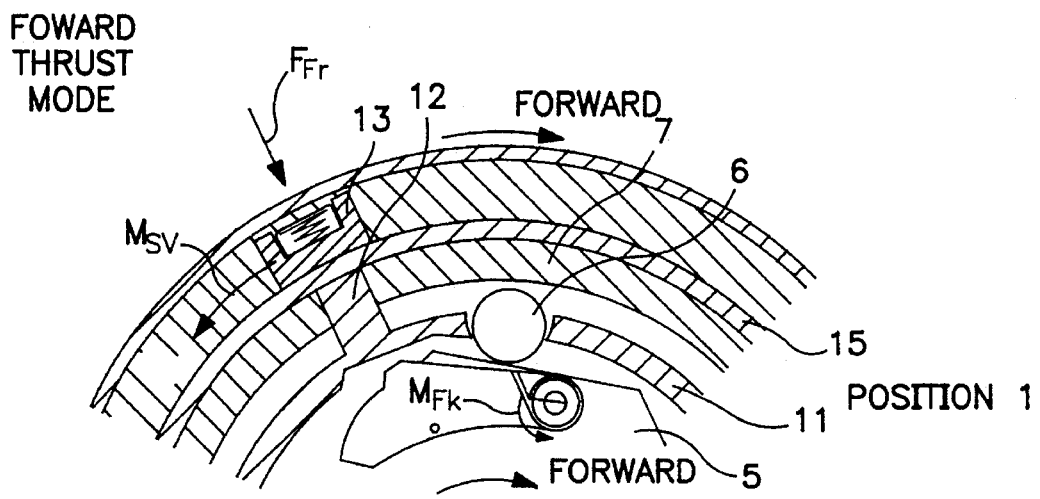
FIGS. 6,7,8 schematically show operation of the invention for three different initial positions at start for forward travel in thrust mode for the first embodiment.
Figure 7:
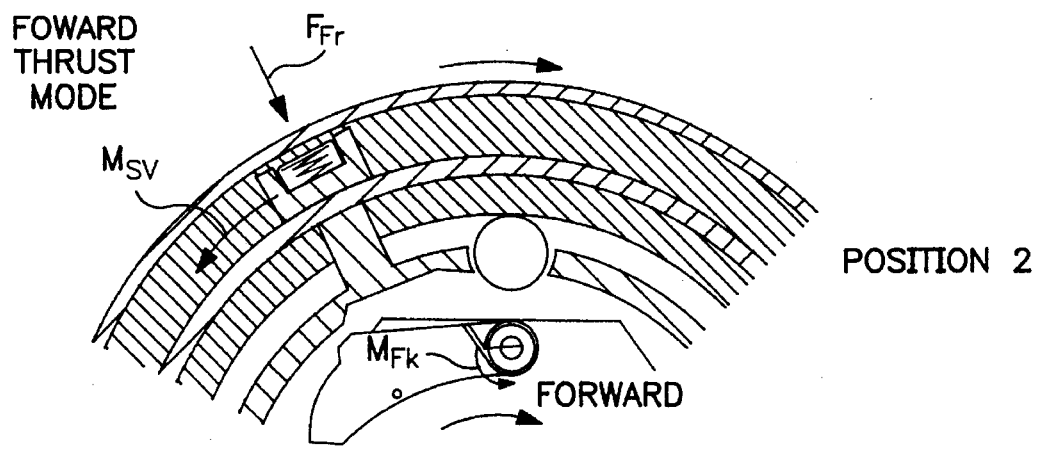
Figure 8:
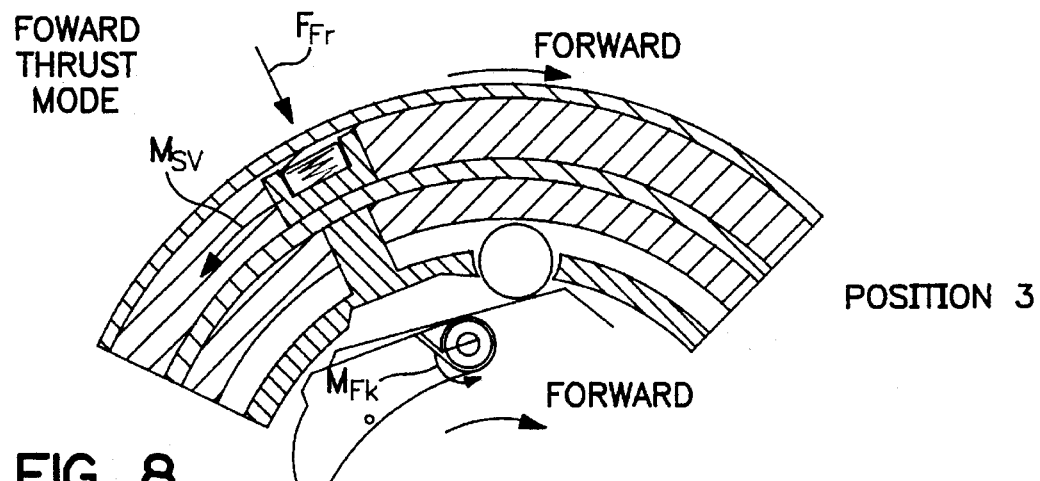

2. Starting forward in thrust mode (FIGS. 6 to 8).

If the vehicle rolls on a slope without the accelerator being operated (engine brakes), the outer ring 7 (large outer arrow labelled FORWARD) drives. Also, the two rings 5,7 will rotate at the same speed on a firm road surface. If the free-wheeling coupling is in position 1 (FIG. 6), the clamping elements 6 can go into coupling position (which they should not do) when the cage 11 is not held by friction by the friction ring 15 (tractive moment $M_{sv}$). The same applies to position 2 (FIG. 7).

In position 3 (FIG. 8), the clamping rollers are already in clamping position, but are not yet clamped. In this position the danger of unwanted coupling is especially great, and therefore a considerable tractive moment $M_{sv}$ and thereby also a great frictional force $F_{fr}$ are needed in order to hold the cage 11 while the two rings 5,7 are torn away (from position 3 via position 2 into position 1) without clamping to take place.

Figure 9:
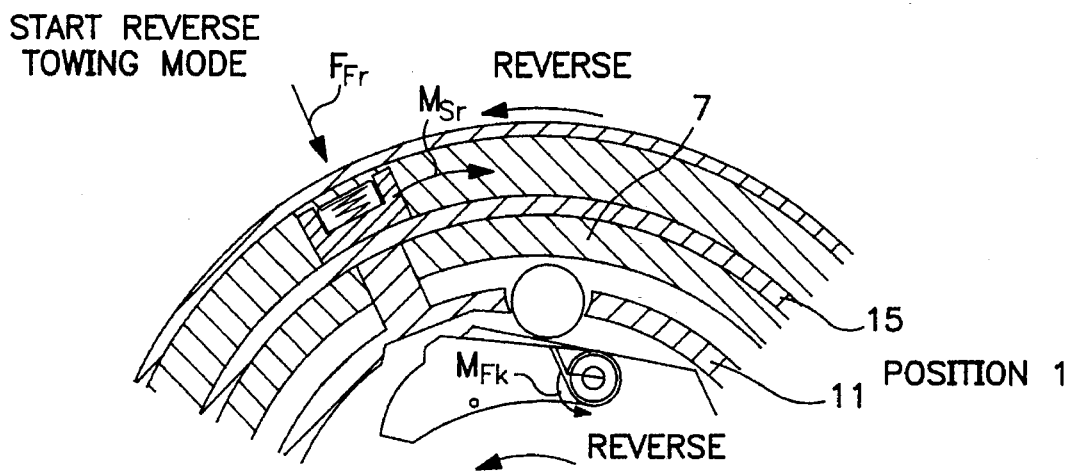
FIGS. 9,10,11 schematically show operation for three different initial positions at start for reverse travel in towing mode for the first embodiment.
Figure 10:
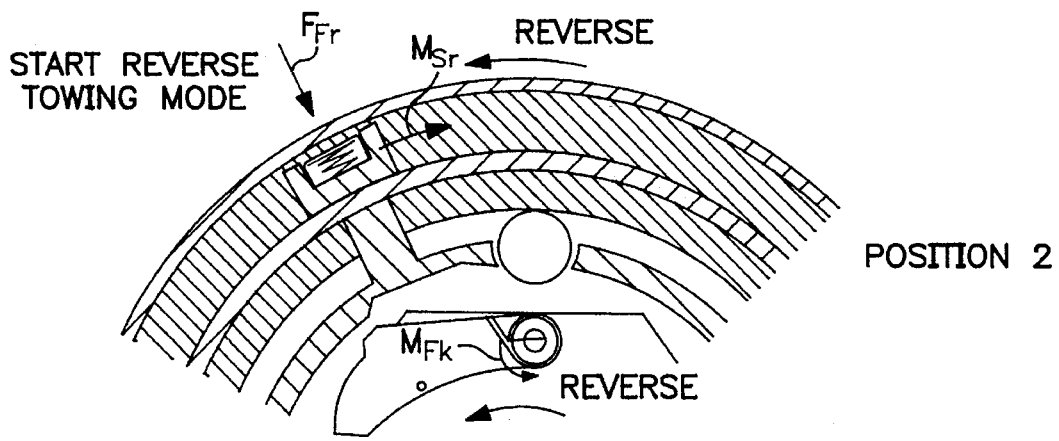
Figure 11:
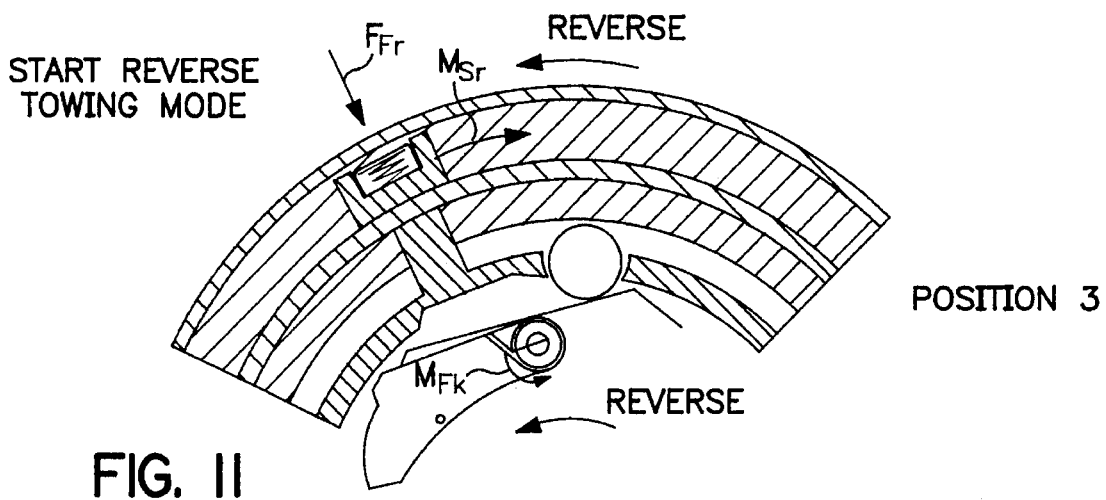

3. Starting in reverse in towing mode (FIGS. 9 to 11):

When starting from position 1 (FIG. 9), frictional contact between cage 11 and outer ring 7 (present in the first variant of the first embodiment) suffices to hold the clamping elements 6 in engagement position (position 3), and the friction in relation to the fixed friction ring 15 (in the second variant of the first embodiment) has the same effect. This also applies to position 2 (FIG. 10), except that the path is shorter.

4. Starting in reverse in thrust mode (FIGS. 12 to 14)

When rolling backwards from position 1 (FIG. 12), the clamping elements 6 are in coupling position without however being coupled. The tractive moment $M_{sr}$ causes them to be brought via position 2 (FIG. 13) into position 3 (FIG. 14) in which they cannot couple.

Figure 15:
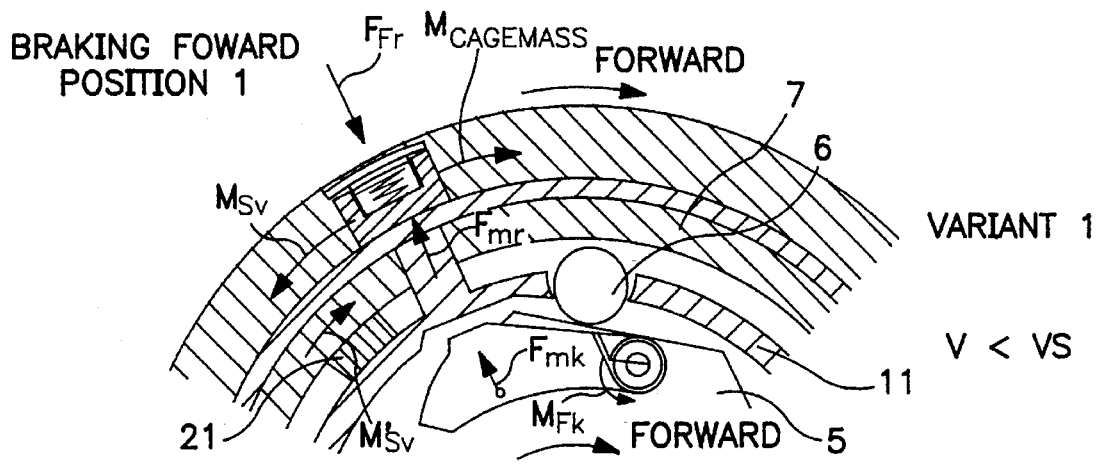
FIGS. 15,16,17 schematically show operation when braking under different conditions in forward travel in the first variant of the first embodiment.
Figure 16:
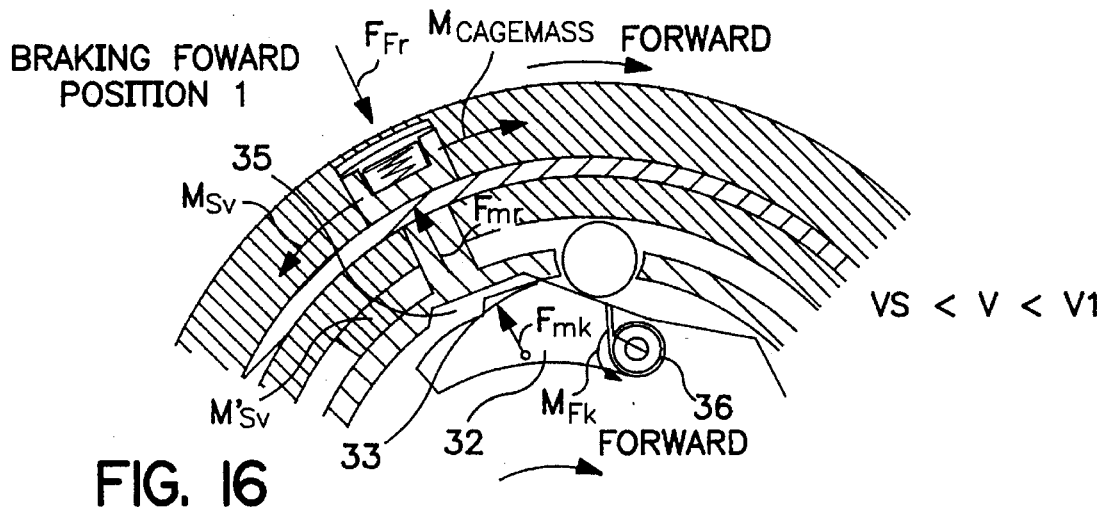
Figure 17:
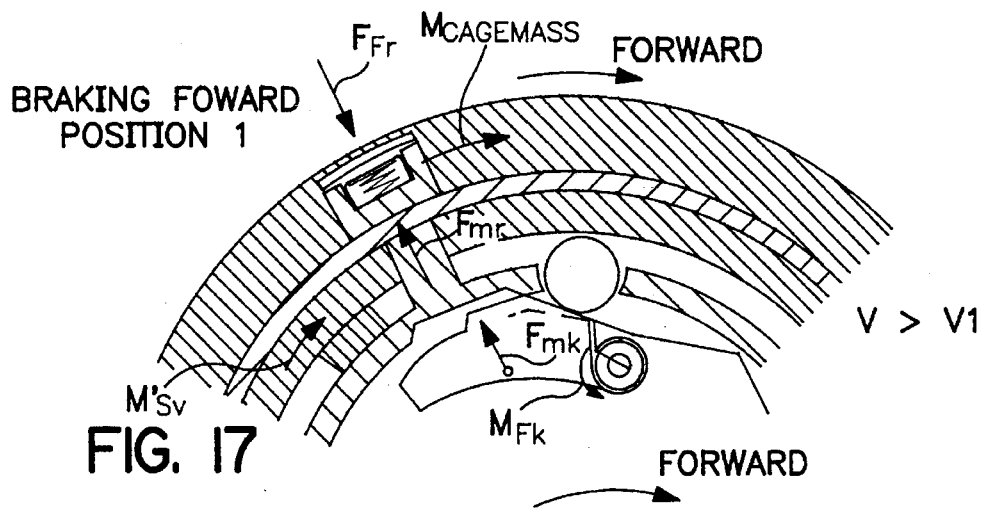

5. Braking during forward travel, first variant of the first embodiment (FIGS. 15 to 17)

During forward travel in towing mode, the clamping elements 6 are always in position 1. If the brakes are now applied, what follows depends on the travel speed at the beginning of brake application. If, as shown in FIG. 15, it is less than vs (that is the speed beyond which the rear axle drive should be uncoupled during braking), the outer ring 7 starts to pass the inner ring 5 (larger outer arrow labelled FORWARD), the cage 11 is slaved by the frictional moment $M'_{sv}$ (because this is the first variant of the first embodiment) between outer ring 7 and cage 11 and by its own moment of inertia $M_{cagemass}$. Since these two moments together are greater than the frictional moment $M_{sv}$, the clamping elements are placed in position 3 in which they transmit the braking forces to the rear axle. However $M_{sv}$ must always be greater than $M'_{sv}$ so that free running is ensured when starting up in thrust mode from position 3.

If the vehicle speed is greater than vs (FIG. 16), the centrifugal force $F_{mk}$ acting on the catch 32 overcomes the moment $M_{fk}$ of the torsion spring 36 and the nose 33 of catch 32 comes to lie in the recess 35 of the cage 11 so that its rotation is stopped in neutral position is ended. The clamping elements 6 cannot go into coupling position and the rear axle therefore runs freely. The catch 32 prevents the clamping elements 6 from breaking through into coupling position even when braking is very abrupt.

If the travel speed is greater than v1 (FIG. 17) the friction segments 13 are lifted off the fixed friction ring 15. Although the tractive moment $M_{sv}$ is removed from the friction ring 15 as a result, the action of the catch 32 is such as described in the preceding paragraph.

Figure 18:
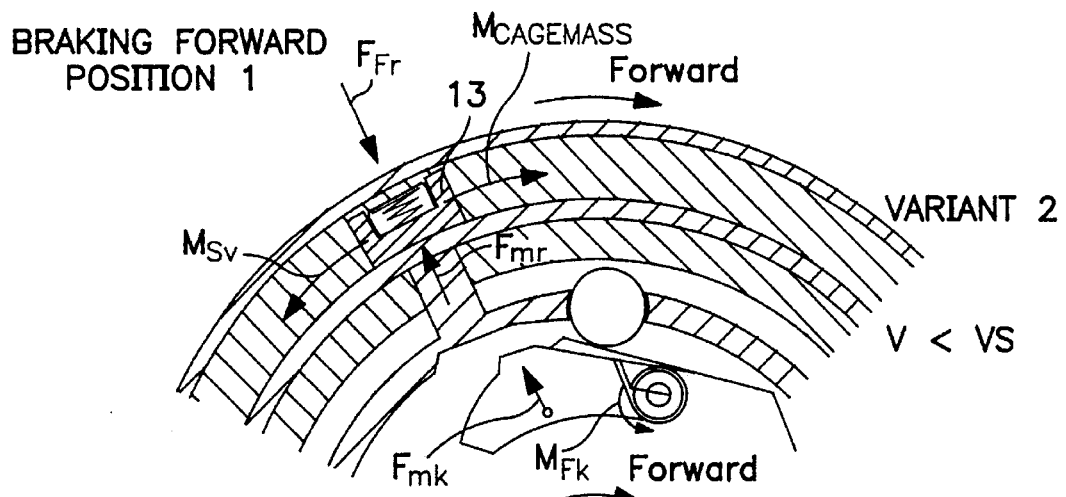
FIGS. 18,19,20 schematically show operation when braking under three different conditions in forward travel in the second variant of the first embodiment.
Figure 19:
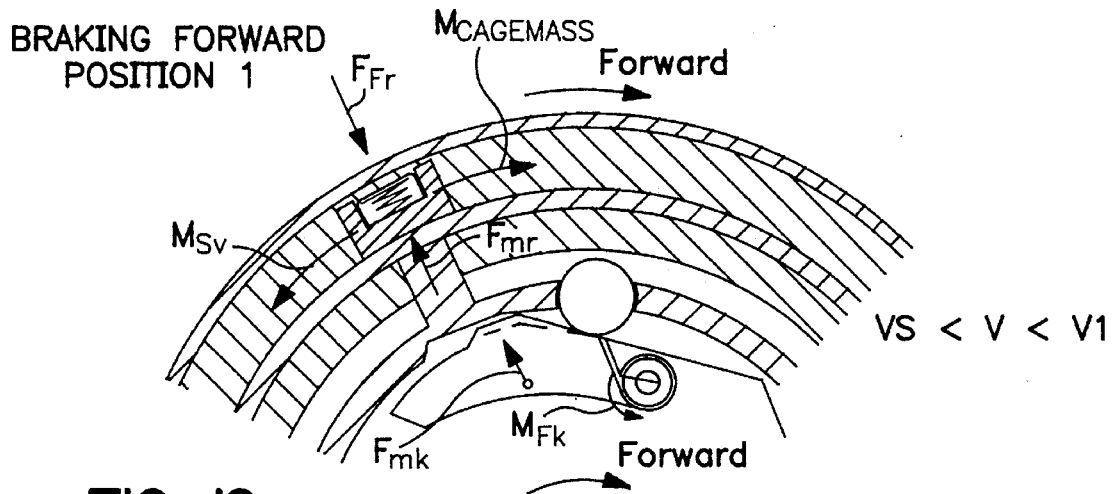

6. Braking during forward travel, second variant of the first embodiment (FIGS. 18 to 20)

Figure 20:
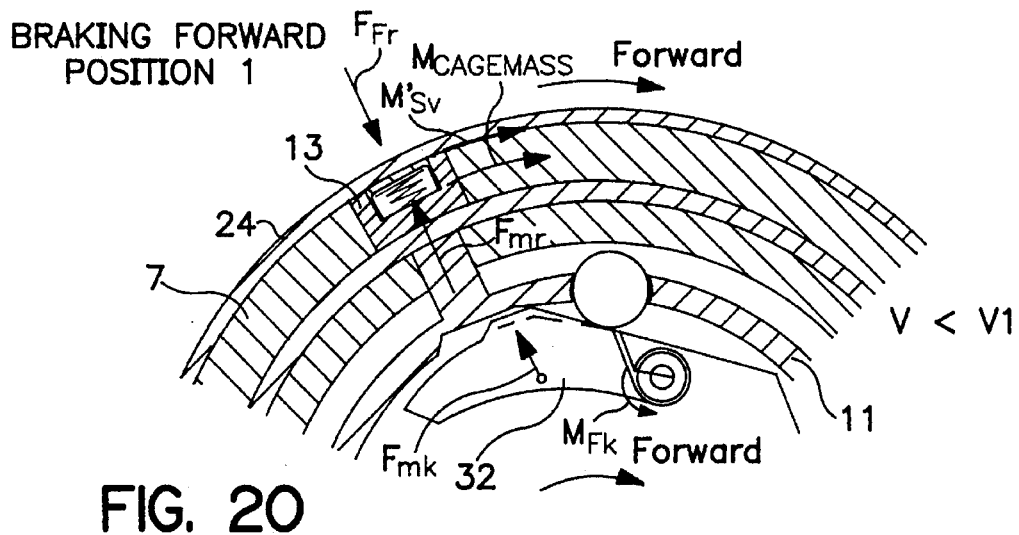

The second variant of the first embodiment is different from the above only if the travel speed v is greater than v1 (FIG. 20). In that case, the lifted friction segments 13 press outwardly against stop 24 of the outer ring 7. As a result, the frictional moment $M'_s$ of stop 24 which is very high because of the centrifugal force $F_{mr}$ acting upon the friction segments 13, acts upon the cage 11, and the moment of inertia $M_{cagemass}$ of the cage and the centrifugal force are absorbed by the catch 32 as soon as the clamping elements are in neutral position.

Figure 21:
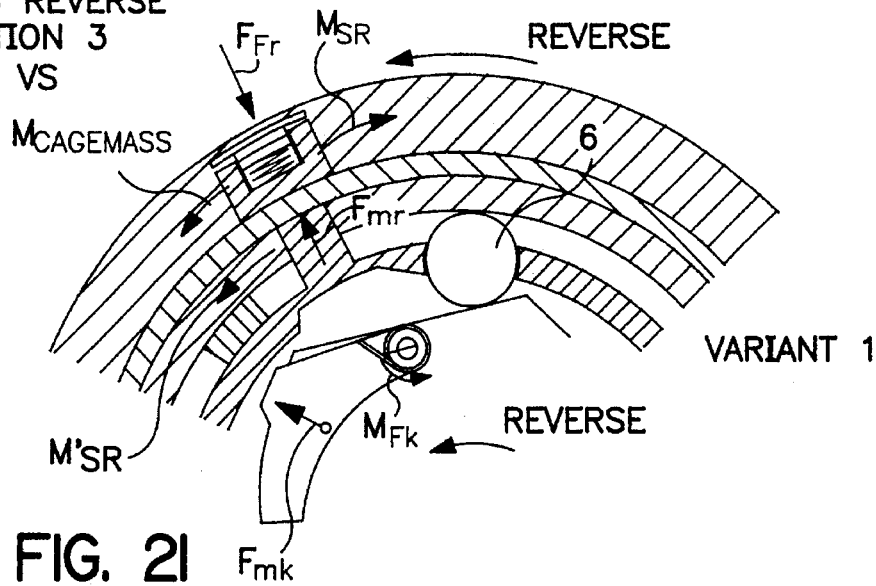
FIG. 21 schematically shows operation when braking in reverse travel in the first variant of the first embodiment.
Figure 22:
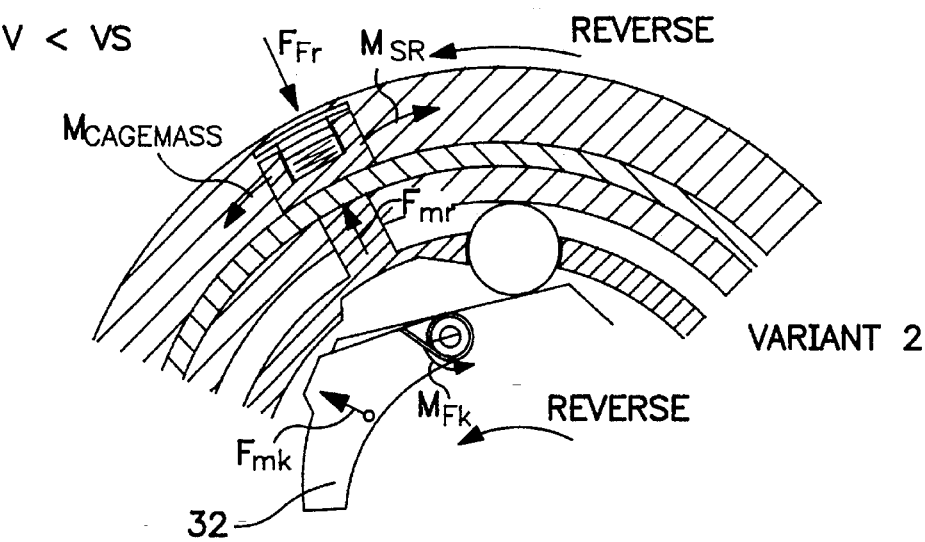
FIG. 22 schematically shows operation when braking in reverse travel in the second variant of the first embodiment.

7. Braking in reverse, both variants of the first embodiment (FIGS. 21 and 22)

During braking in reverse travel, the clamping elements 6 are always in position 3. The free-wheeling coupling is therefore assumed to be in this position at the beginning of braking. Whether uncoupling then takes place depends on the relationship of the frictional moments and the moment of mass of the cage. The frictional moments vary depending on the variant of the first embodiment. In the first variant (FIG. 21), $M_{sr}$ and $M'_{sr}$ are opposed to each other. As long as $M'_{sr}+M_{cagemass}<M_{sr}$, free running is ensured. If the mass of the cage is increased, coupling takes place. In the second variant (FIG. 22), there is no $M'_{sr}$ at low speed. Depending on whether the mass of the cage or the frictional moment of the friction segments is greater, coupling or uncoupling takes place. The catch 32 does not enter into play for as long as travel is not rapid. With normal vehicles however, one does not travel rapidly in reverse.

Figure 24:
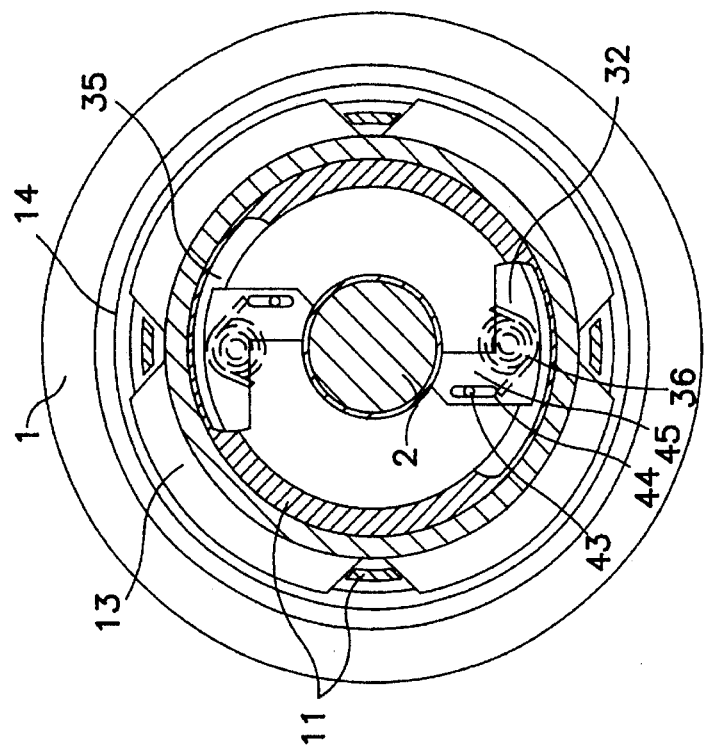
FIG. 24 is a cross-section taken along XXIV—XXIV of FIG. 23.
Figure 23:
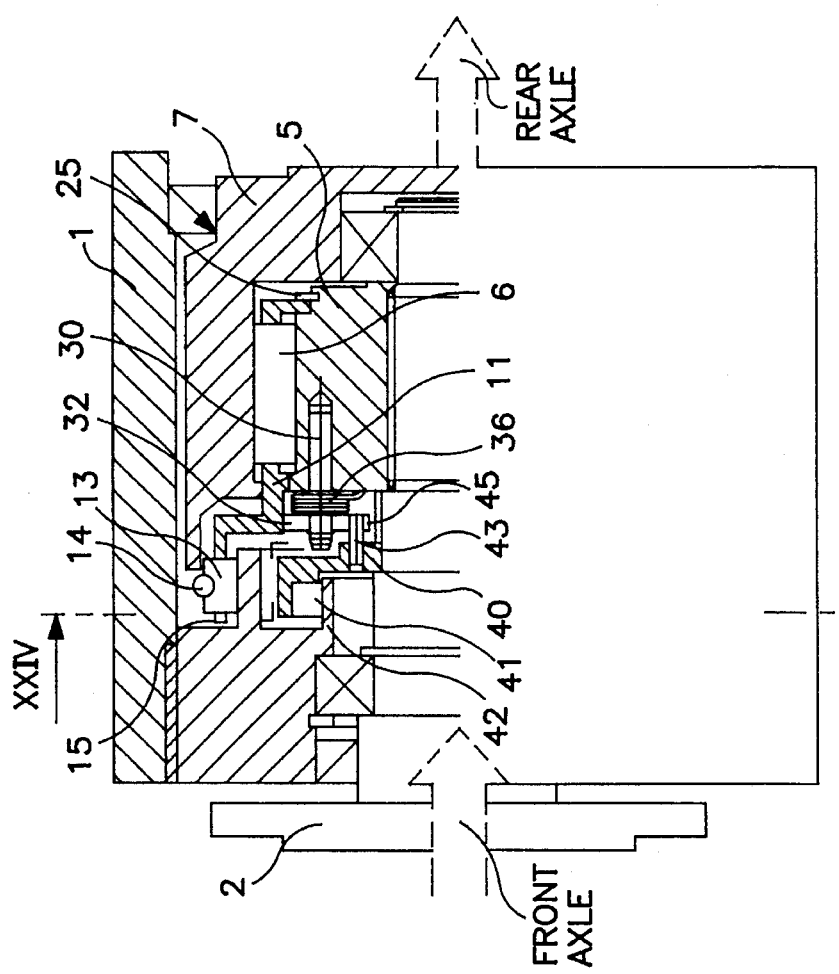
FIG. 23 is an axial section through a second embodiment of the free-wheeling coupling according to the invention.

In FIGS. 23 and 24 which represent a second embodiment of the invention, identical parts are given the same reference numbers as in the first embodiment. Only those parts by which this second embodiment differs from the first are described and are given different reference numbers. The catch 32 is able to swivel around axis 30 approximately in its center of gravity and is provided with a foot 45 with an oblong opening 44. A slaving pin 43 of a friction body 40 capable of rotating on shaft 4 and which rubs with a friction lining 41 on a second fixed friction ring or collar 42 engages this opening. The friction lining 41 lifts off at high rotational speed in a similar manner to friction segments 13 and the second fixed friction ring 42 may also be identical with the first fixed friction ring 15. The spring 36 is placed so that in forward travel its force is applied in the same direction as the force exerted by friction body 40 on catch 32 and in reverse travel is opposite to this force. As a result, the catch 32 is always in active position during forward travel, even at high speed, and is retracted for reverse travel.

With the exception of these differences, the operation is the same as for the first embodiment.

Figure 25:
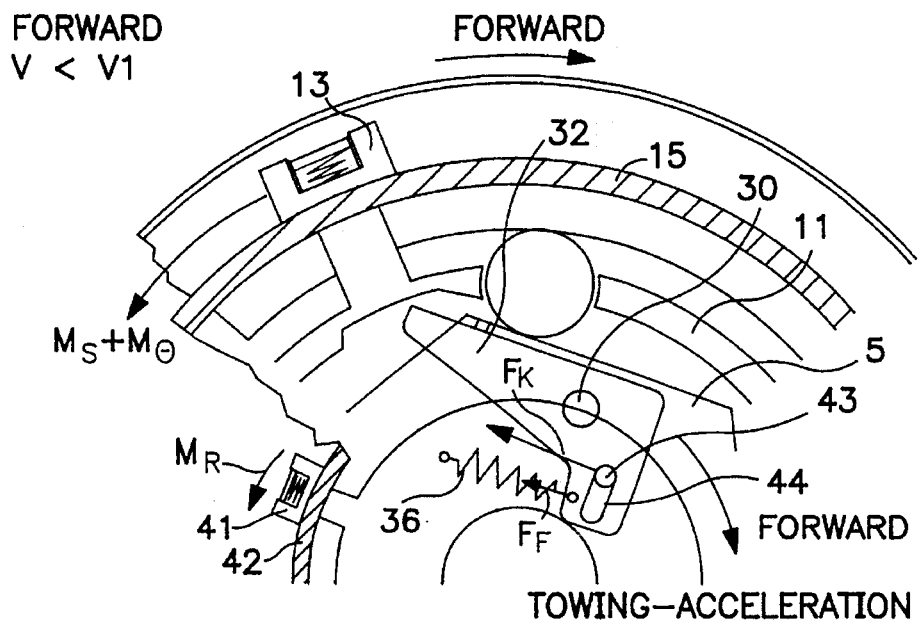
FIG. 25 schematically shows operation of the second embodiment at low speed and with forward acceleration.

FIG. 25: During forward acceleration at low speed (i.e., at a speed at which the friction segments 13 are still pressing against the friction collar 15), the inner ring 5 rotates faster than the outer ring 7. The cage 11 is retained by the friction segments 13.

Figure 26:
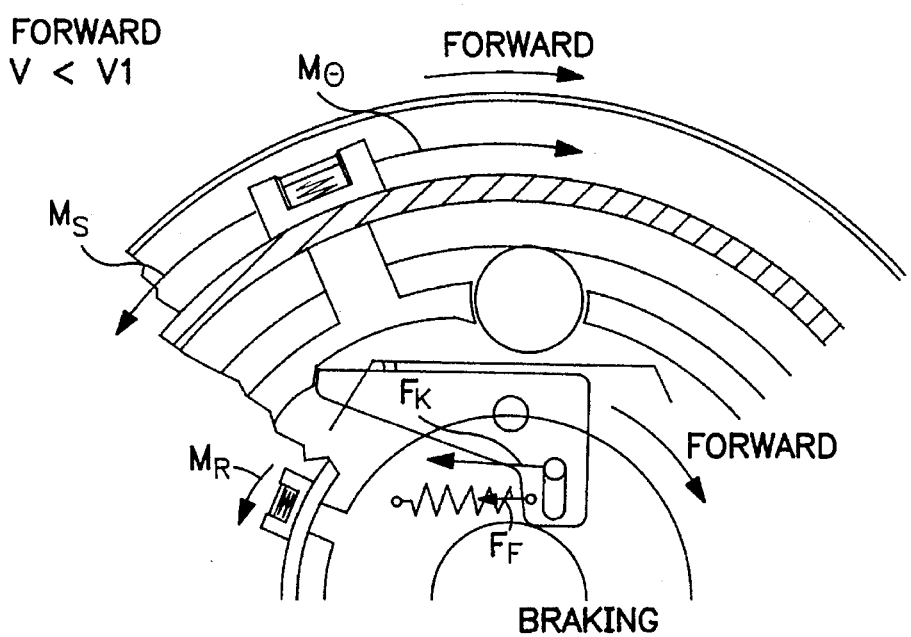
FIG. 26 schematically shows operation of the second embodiment at low speed when braking in forward travel.

FIG. 26: If the brake is applied while traveling forward at low speed, the inner ring 5 is decelerated more than the outer ring 7. With normal deceleration, the force of the friction segments 13 is sufficient to keep the cage 11 in free-running position. With rapid deceleration (blocking of the front axle), the moment of inertia of the cage 11 could exceed the tractive moment of the friction segments 13 and move the cage 11 together with the clamping elements 6 towards the thrusting position. This is prevented by the catch 32 locking the cage 11 in free-running position.

Figure 27:
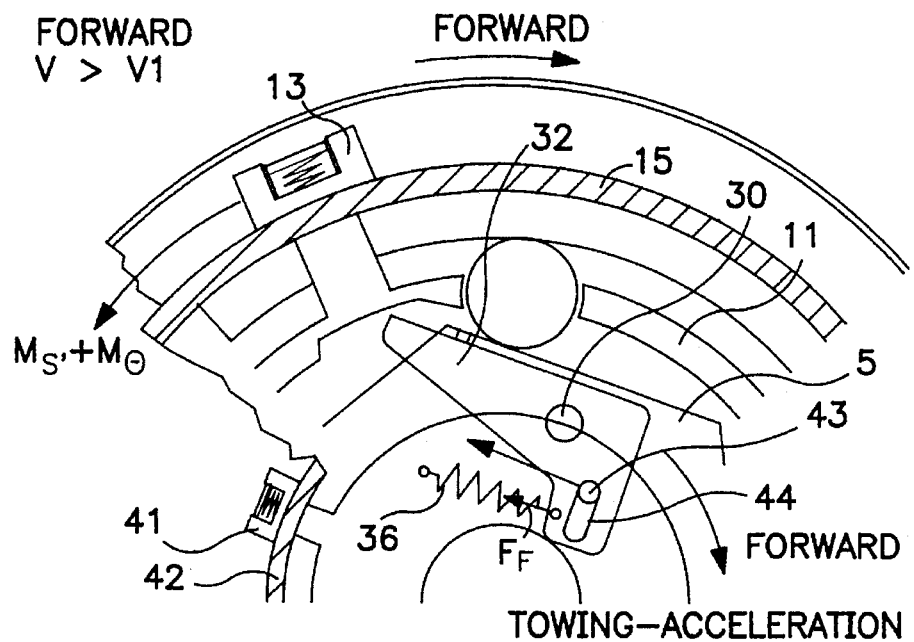
FIG. 27 schematically shows operation of the second embodiment at high speed with forward acceleration.

FIG. 27: During forward travel at high speed, both friction elements 13 and 41 are lifted from their counter-surfaces by centrifugal force and no friction losses occur there, by contrast to the states according to FIGS. 25 and 26, if the cage 11 includes the radial stop 20 for the friction segments 13.

Figure 28:
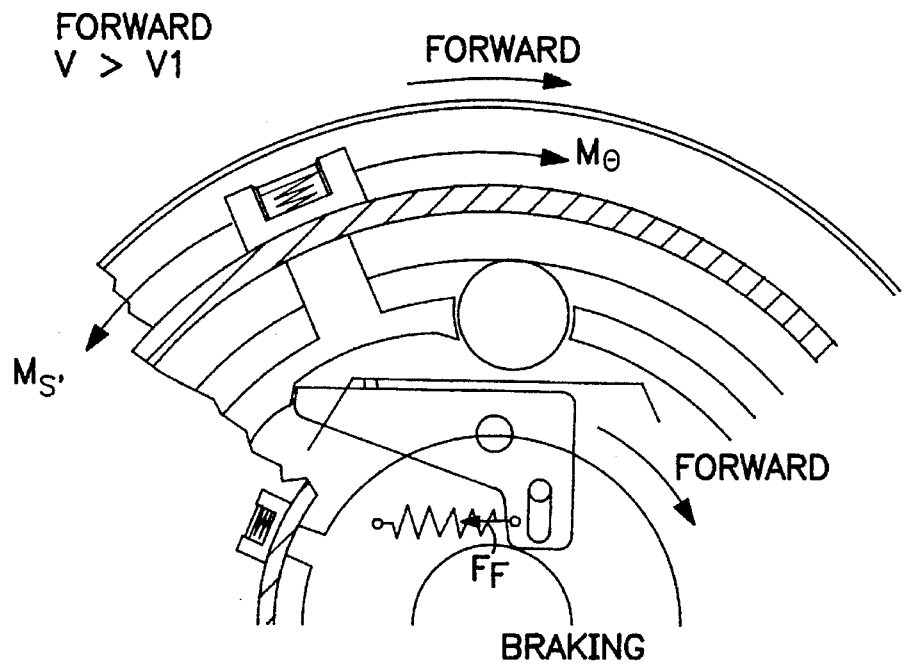
FIG. 28 schematically shows operation of the second embodiment at high speed when braking in forward travel.

FIG. 28: The catch causes uncoupling.

Figure 29:
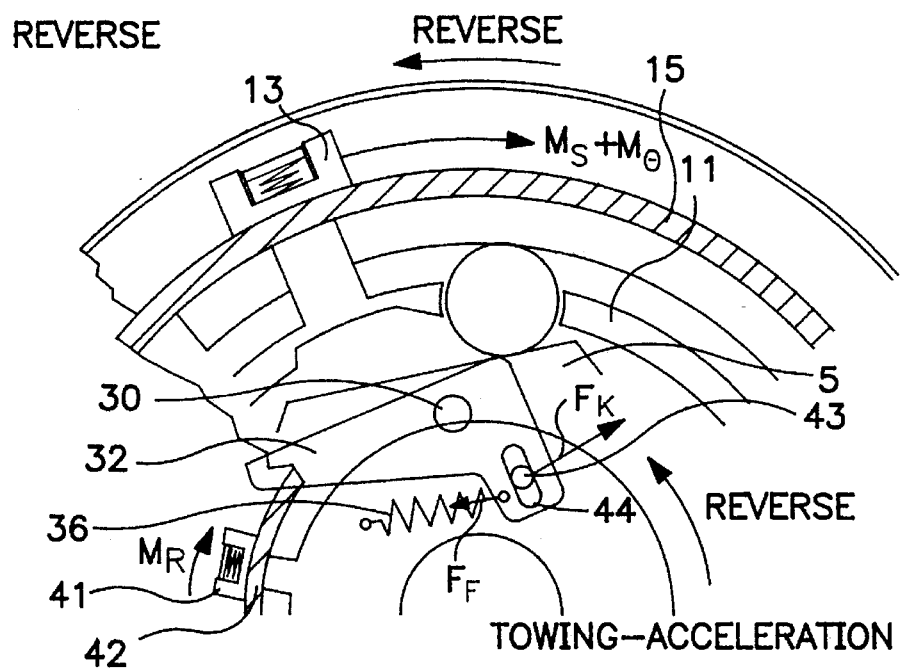
FIG. 29 schematically shows operation of the second embodiment during reverse acceleration in towing mode.
Figure 30:
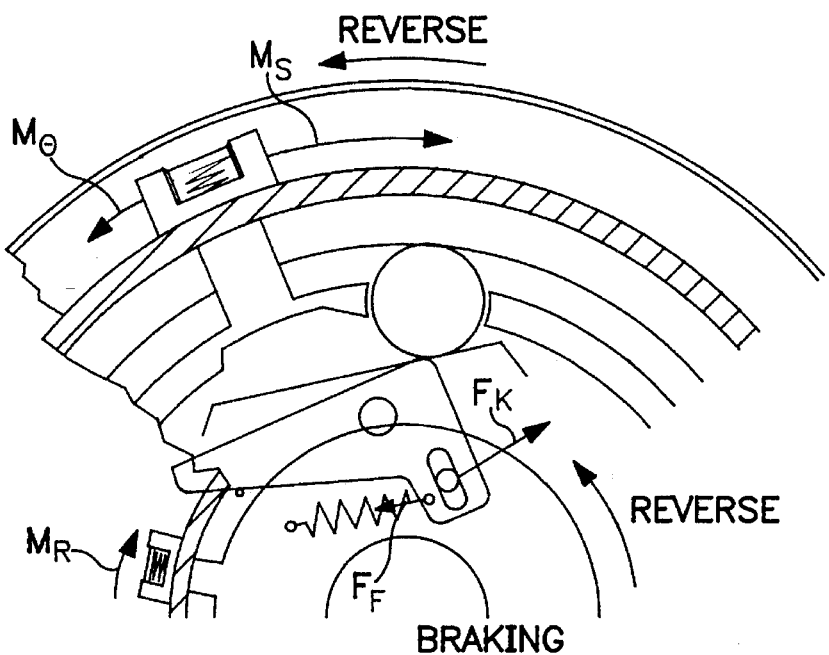
FIG. 30 schematically shows operation of the second embodiment when braking in reverse travel.

FIGS. 29 and 30: Since the catches are retracted by the effect of the friction lining 41 during reverse travel, both directions of torque flow are possible.

While the invention has been described by reference to specific embodiments, this was for purposes of illustration only. Numerous alternative embodiments will be apparent to those skilled in the art and are considered to be within the scope of the invention.

I claim:

1. A free-wheeling coupling sensitive to the direction of rotation for a motor vehicle, comprising
    a first ring which constitutes a driving element in a towing mode for a motor vehicle,
    a second ring which constitutes a driven element in said towing mode,
    clamping elements which act between said first and second rings to transfer torque between said first and said second rings in both directions of torque flow,
    a cage in which said clamping elements are disposed,
    a first fixed friction ring,
    a first friction element comprising at least one friction segment connecting said cage to said fixed friction ring, said friction segment being slaved to rotate in a circumferential direction with said cage, said friction segment being lifted away from said fixed friction ring by centrifugal force when it is caused to rotate at a rotational speed which is greater than a first-predetermined rotational speed,
    at least one catch acting between said first ring and said cage, and
    a spring urging said catch out of engagement with said cage.

2. The free-wheeling coupling of claim 1 wherein said cage includes at least one recess for engagement with said catch, and wherein said catch is pivotally mounted on said first ring for engagement with said recess.

3. The free-wheeling coupling of claim 2 wherein said catch is eccentrically mounted, and wherein said catch is caused to engage with said recess by centrifugal force when said catch rotates at a rotational speed which is greater than a second predetermined rotational speed.

4. The free-wheeling coupling of claim 1 further comprising a second friction element in frictional engagement with a second fixed friction ring, wherein one of said cage and said first ring includes at least one recess for engagement with said catch, wherein said catch is essentially centrically mounted on the other of said first ring and said cage, and wherein said second friction element acts on said catch at a point of application of force so as to cause said catch to engage with said recess.

5. The free-wheeling coupling of claim 1 wherein said cage includes a stop to prevent outward movement of said frictional segment, said free-wheeling coupling further comprising a frictional unit disposed between said second ring and said cage.

6. The free-wheeling coupling of claim 1 wherein said second ring includes a stop to prevent outward movement of said frictional segment, said stop exerting a frictional torque on said second ring and causing a relative rotation between said second ring and said cage when said frictional segment comes into contact with said stop.

7. The free-wheeling coupling of claim 1 wherein said first ring includes at least one recess for engagement with said catch, and wherein said catch is pivotally mounted on said cage for engagement with said recess.

* * * * *